United States Patent
Ismailova et al.

(10) Patent No.: US 11,924,590 B2
(45) Date of Patent: Mar. 5, 2024

(54) IMAGE COLOR CORRECTION SYSTEMS AND METHODS

(71) Applicant: Teledyne FLIR Commercial Systems, Inc., Goleta, CA (US)

(72) Inventors: Darya Ismailova, Victoria (CA); Shuen Yan Stephen Se, Richmond (CA)

(73) Assignee: Teledyne FLIR Commercial Systems, Inc., Goleta, CA (US)

( * ) Notice: Subject to any disclaimer, the term of this patent is extended or adjusted under 35 U.S.C. 154(b) by 53 days.

(21) Appl. No.: 17/701,629

(22) Filed: Mar. 22, 2022

(65) Prior Publication Data

US 2022/0329766 A1 Oct. 13, 2022

Related U.S. Application Data

(60) Provisional application No. 63/174,470, filed on Apr. 13, 2021.

(51) Int. Cl.
  *G06K 9/00* (2022.01)
  *H04N 9/64* (2023.01)

(52) U.S. Cl.
  CPC .................... *H04N 9/646* (2013.01)

(58) Field of Classification Search
  CPC ........................................................ G06T 3/40
  See application file for complete search history.

(56) References Cited

U.S. PATENT DOCUMENTS

| | | | | |
|---|---|---|---|---|
| 8,525,899 B2* | 9/2013 | Imai | ........................ | H04N 23/88 |
| | | | | 348/222.1 |
| 8,611,656 B2* | 12/2013 | Kim | ........................ | H04N 23/88 |
| | | | | 382/167 |
| 2009/0169103 A1* | 7/2009 | Chang | .................... | H04N 9/646 |
| | | | | 382/167 |
| 2011/0293174 A1* | 12/2011 | Kim | ........................ | H04N 23/88 |
| | | | | 382/162 |

(Continued)

FOREIGN PATENT DOCUMENTS

| | | | | |
|---|---|---|---|---|
| CA | 3044988 A1 * | 12/2019 | ........... | G06T 7/0002 |
| CN | 102769759 | 11/2012 | | |

(Continued)

OTHER PUBLICATIONS

Color correction pipeline optimization for digital cameras, Simone Blanco, JOEI, 2013, pp. 023014-1 to 023014-10 (Year: 2013).*

(Continued)

*Primary Examiner* — Jayesh A Patel
(74) *Attorney, Agent, or Firm* — Haynes and Boone, LLP

(57) ABSTRACT

Techniques for facilitating image color correction are provided. In one example, a method includes receiving an image. The method further includes determining, based at least on the image, a first scaling value and a second scaling value. The method further includes applying the first scaling value to the image to obtain a scaled image. The method further includes applying a color correction matrix (CCM) to the scaled image to obtain a CCM image. The method further includes applying the second scaling value to the CCM image to obtain a color corrected image. Related devices and systems are also provided.

20 Claims, 7 Drawing Sheets

(56) References Cited

U.S. PATENT DOCUMENTS

| | | | |
|---|---|---|---|
| 2012/0050567 A1* | 3/2012 | Cote | H04N 25/68 382/167 |
| 2013/0093914 A1* | 4/2013 | Bai | H04N 23/88 382/167 |
| 2015/0146077 A1* | 5/2015 | Keelan | H01L 27/14621 348/342 |
| 2015/0296193 A1* | 10/2015 | Cote | H04N 9/646 382/167 |
| 2019/0045162 A1* | 2/2019 | Krestyannikov | H04N 9/3182 |
| 2019/0045163 A1* | 2/2019 | Nikkanen | H04N 23/88 |
| 2019/0373232 A1* | 12/2019 | Brown | H04N 9/67 |
| 2020/0243042 A1* | 7/2020 | Su | G09G 5/10 |

FOREIGN PATENT DOCUMENTS

| | | |
|---|---|---|
| CN | 104217409 | 12/2014 |
| CN | 108282647 | 7/2018 |
| CN | 108712639 | 10/2018 |
| CN | 109155071 | 1/2019 |
| CN | 110830778 | 2/2020 |
| WO | WO-2006104666 A2 * | 10/2006 ............. H04N 5/253 |
| WO | WO-2018093785 A1 * | 5/2018 ............. G06T 5/40 |

OTHER PUBLICATIONS

Color by Correlation: A Simple, Unifying Framework for Color Constancy, Graham D Finlayson et al., IEEE, 2001, pp. 1209-1221 (Year: 2001).*

QiuJueqin, "Matlab Camera Color Correction Toolbox" Nov. 6, 2020, 3 pages, MIT.

Guowei Hong et al., "A Study of Digital Camera Colorimetric Characterization Based on Polynomial Modeling", Article in Color Research & Application, Feb. 21, 2000, vol. 26, pp. 76-84.

R.W.G. Hunt et al. "Relative Spectral Power Distributions of Illuminants", Measuring Colour, Fourth Edition, Appendix, pp. 355-378.

C.S. McCamy, "Correlated Color Temperature as an Explicit Function of Chromaticity Coordinates" Color Research and Application, Apr. 1992, vol. 17, pp. 142-144.

Bruce Justin Lindbloom, "XYZ to xyY", Apr. 8, 2017. Retrieved Jun. 22, 2022 http://www.brucelindbloom.com/index.html?Eqn_XYZ_to_xyY.html.

* cited by examiner

IMAGE COLOR CORRECTION SYSTEMS AND METHODS

CROSS-REFERENCE TO RELATED APPLICATIONS

This application claims priority to and the benefit of U.S. Provisional Patent Application No. 63/174,470 filed Apr. 13, 2021 and entitled "IMAGE COLOR CORRECTION SYSTEMS AND METHODS," which is hereby incorporated by reference in its entirety.

TECHNICAL FIELD

One or more embodiments relate generally to imaging and more particularly, for example, to image color correction systems and methods.

BACKGROUND

Imaging systems may include an array of detectors, with each detector functioning as a pixel to produce a portion of a two-dimensional image. There are a wide variety of image detectors, such as visible-light image detectors, infrared image detectors, or other types of image detectors that may be provided in an image detector array for capturing an image. As an example, a plurality of sensors may be provided in an image detector array to detect electromagnetic (EM) radiation at desired wavelengths. In some cases, such as for visible-light imaging, readout of image data captured by the detectors may be performed in a time-multiplexed manner by a readout circuit. The image data that is read out may be communicated to other circuitry, such as for processing, storage, and/or display.

SUMMARY

In one or more embodiments, a method includes receiving an image. The method further includes determining, based at least on the image, a first scaling value and a second scaling value. The method further includes applying the first scaling value to the image to obtain a scaled image. The method further includes applying a color correction matrix (CCM) to the scaled image to obtain a CCM image. The method further includes applying the second scaling value to the CCM image to obtain a color corrected image.

In one or more embodiments, a method includes receiving an image. The method further includes obtaining a correlated color temperature associated with the image. The method further includes obtaining a CCM based on the correlated color temperature. The method further includes generating a color corrected image based on the CCM.

In one or more embodiments, a system includes a processing circuit configured to receive an image. The processing circuit is further configured to determine, based at least on the image, a first scaling value and a second scaling value. The processing circuit is further configured to apply the first scaling value to the image to obtain a scaled image. The processing circuit is further configured to apply a CCM to the scaled image to obtain a CCM image. The processing circuit is further configured to apply the second scaling value to the CCM image to obtain a color corrected image.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
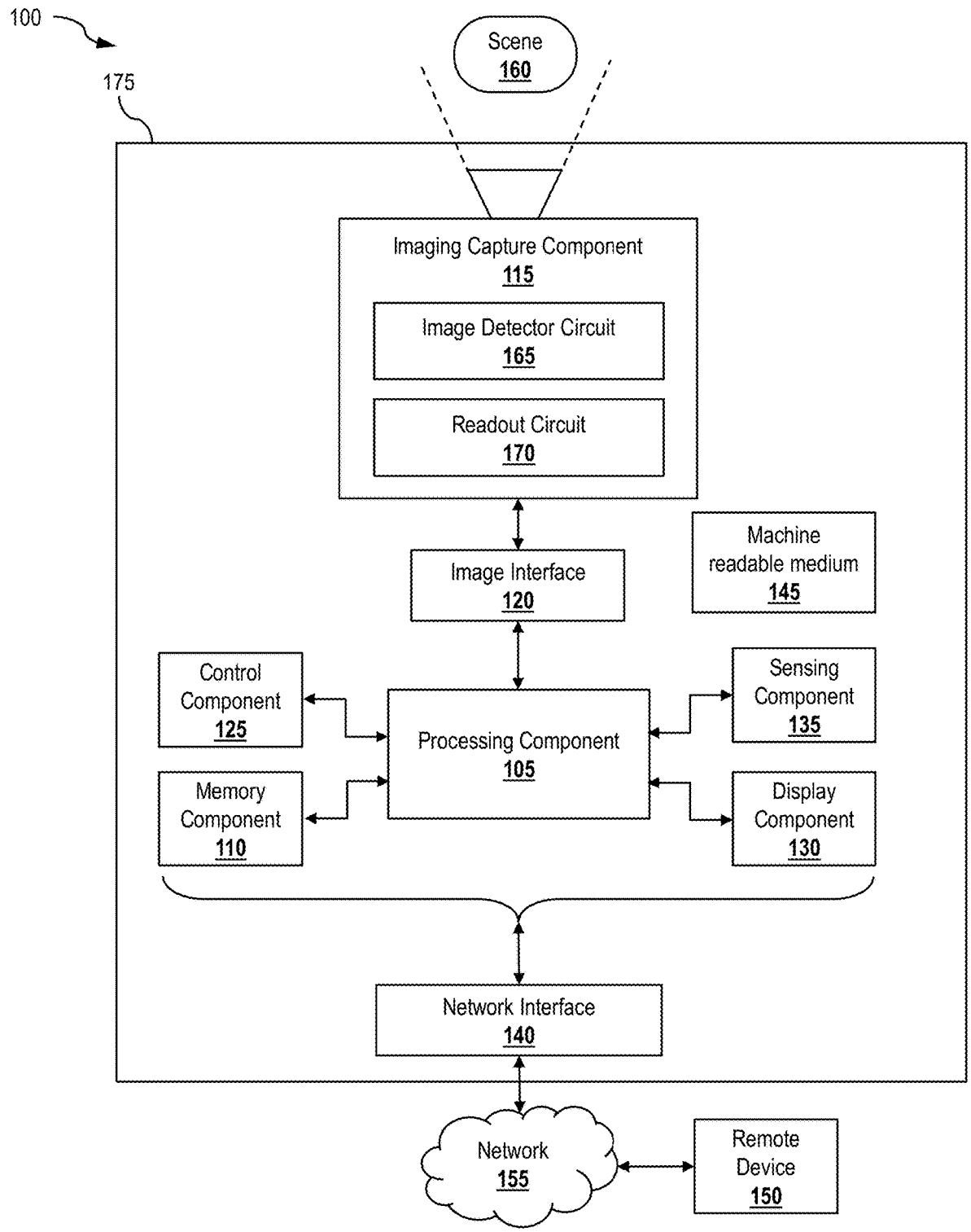
FIG. 1 illustrates a block diagram of an example imaging system in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided to facilitate color correction of images. Color correction of images may allow for color reproduction and high color accuracy, which may facilitate various applications, such as machine vision applications. Machine vision applications may be utilized, by way of non-limiting examples, in the life sciences, medical applications, microscopy, and/or other fields/applications. For example, an image captured under a microscope may include blood cells whose colors may need to be corrected (e.g., for improved color accuracy) to facilitate analysis (e.g., by a user(s) and/or by a machine(s)).

Color correction may be performed by an imaging system. An imaging system may include an image sensor device and a processing circuit. The image sensor device includes detectors (e.g., also referred to as detector pixels, detector elements, or simply pixels). Each detector pixel detects incident EM radiation and generates images (e.g., visible-light images) indicative of the detected EM radiation of a scene. The images generated by the image sensor device may be based at least in part on a spectral response curve associated with the image sensor device. The processing circuit may perform color correction on images to improve color fidelity/accuracy of these images. The processing circuit may receive images of the scene from the image sensor device and/or retrieve, from a memory, stored images of the scene captured by the image sensor device. In this regard, the images may be provided to the processing circuit from the image sensor device as the images are being captured by the image sensor device (e.g., in around real time). In other cases, the images may be stored (e.g., by the image sensor device and/or the processing circuit) in a memory of the imaging system and retrieved by the processing circuit at least for color correction. The memory may be a part of the imaging system or generally any memory accessible to the processing circuit. The stored images may be retrieved as needed for an application.

In various embodiments, color correction may be based on applying a polynomial color correction matrix (CCM) to images. In this regard, for the polynomial CCM, an $(R, G, B)^T$ vector may be expanded using polynomial regression to add additional polynomial terms. As a non-limiting example, in an aspect, the $(R, G, B)^T$ vector may be expanded to a vector $(R, G, B, R^2, G^2, B^2, RG, GB, RB)^T$ having second order terms (e.g., the squared terms (e.g., $R^2$) and cross-channel terms (e.g., RG)). In this example, the polynomial CCM can be provided as a 3×9 matrix. Entries/elements of the polynomial CCM may be determined based on a calibration image. The calibration image may be a standard test image used in image processing, such as a color test chart (e.g., Macbeth color chart) or generally any image having known/standardized characteristics (e.g., reflectance values for each of the R, G, and B channels measured with spectrophotometer or standard/published values, known illuminant, etc.).

For the 3×9 CCM, if an average brightness of an image (e.g., also referred to as a current image) to which the 3×9 CCM is to be applied differs from the calibration image (e.g., by a factor k) due to a different scene illuminance and/or a different camera exposure, individual components of the expanded vector scale by k (e.g., for the first order terms) or $k^2$ (e.g., for the second order terms) and individual entries/elements of the 3×9 polynomial CCM also need to change due to the average brightness difference.

In some embodiments, to mitigate/address this average brightness difference between the current image and the calibration image, the processing circuit may scale the current image before and after applying the polynomial CCM using scaling values (e.g., also referred to as scaling factors). The current image may be scaled by a first scaling value (denoted as $scale_1$) to obtain a scaled image. The scaling value $scale_1$ may be determined based on the current image and the calibration image to address the difference in average brightness between the current image and the calibration image. As one example, the scaling value $scale_1$ may be provided by $scale_1 = I_{calib}/I_{im}$, where $I_{calib}$ and $L_{im}$ is the average relative luminance of the calibration image and the current image, respectively, to address the average brightness difference between these images. The processing circuit may apply the CCM to the scaled image to obtain a CCM image and then scale the CCM image using a second scaling value (denoted as $scale_2$) to obtain a color corrected image. In an aspect, the scaling value $scale_2$ may be an inverse of the scaling value $scale_1$ such that $scale_2 = 1/scale_1 = I_{im}/I_{calib}$. In an embodiment, scaling the overall image brightness before and after applying the polynomial CCM may reduce exposure dependency and improve color quality. In some cases, a standardized RGB (sRGB) gamma may be applied to the color corrected image prior to display (e.g., if the current image is to be human viewed on a monitor (e.g., calibrated monitor)). It is noted that, although the foregoing provides a polynomial regression that leads to a 3×9 color correction matrix, other polynomial regressions to different degrees and/or CCMs of other sizes (e.g., 3×9, 3×10) may be utilized for color correction.

For any given current image to be color corrected, the processing circuit may determine (e.g., estimate, select) a CCM to apply to the image based on a correlated color temperature (CCT) associated with a scene captured by the image. In some cases, the scene correlated color temperature may be specified by a user. For example, the user may be provided with a user interface (e.g., on a display screen) with correlated color temperature options selectable by the user. In other cases, the correlated color temperature may be determined (e.g., estimated) by the processing circuit, such as based on content/characteristics (e.g., RGB characteristics) of the current image.

In one aspect, the CCM may be one of a predetermined set of CCMs stored in a memory, with each CCM being associated with a correlated color temperature. For example, the processing circuit may select, for application to the current image, the CCM associated with a correlated color temperature that is closest to the correlated color temperature associated with the scene. In this regard, each CCM may be considered to represent color correction parameters calibrated for the correlated color temperature, and the CCM selected for application to the current image may be considered the appropriate CCM (e.g., based on the correlated color temperature) to apply to the image to achieve high color accuracy. In another aspect, the CCM may be determined (e.g., on the fly) based on the correlated color temperature.

Although various embodiments for color correction are described primarily with respect to visible-light imaging, color corrected images generated using methods and systems disclosed herein may be utilized in conjunction with devices and systems such as infrared imaging systems, imaging systems having visible-light and infrared imaging capability, short-wave infrared (SWIR) imaging systems, light detection and ranging (LIDAR) imaging systems, radar detection and ranging (RADAR) imaging systems, millimeter wavelength (MMW) imaging systems, ultrasonic imaging systems, X-ray imaging systems, microscope systems, mobile digital cameras, video surveillance systems, video processing systems, or other systems or devices that may need to obtain image data in one or multiple portions of the EM spectrum. For example, the color corrected images may be visible-light images of a scene that can be fused/blended with infrared images of the scene.

Referring now to the drawings, FIG. 1 illustrates a block diagram of an example imaging system 100 (e.g., a visible-light camera, a tablet computer, a laptop, a personal digital assistant (PDA), a mobile device, a desktop computer, or other electronic device) in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided.

The imaging system 100 may be utilized for capturing and processing images in accordance with an embodiment of the disclosure. The imaging system 100 may represent any type of imaging system that detects one or more ranges (e.g., wavebands) of EM radiation and provides representative data (e.g., one or more still image frames or video image frames). The imaging system 100 may include a housing that at least partially encloses components of the imaging system 100, such as to facilitate compactness and protection of the imaging system 100. For example, the solid box labeled 175 in FIG. 1 may represent a housing of the imaging system 100. The housing may contain more, fewer, and/or different components of the imaging system 100 than those depicted within the solid box in FIG. 1. In an embodiment, the imaging system 100 may include a portable device and may be incorporated, for example, into a vehicle or a non-mobile installation requiring images to be stored and/or displayed. The vehicle may be a land-based vehicle (e.g., automobile, truck), a naval-based vehicle, an aerial vehicle (e.g., unmanned aerial vehicle (UAV)), a space vehicle, or generally any type of vehicle that may incorporate (e.g., installed within, mounted thereon, etc.) the imaging system 100. In another example, the imaging system 100 may be coupled to various types of fixed locations (e.g., a home security mount, a campsite or outdoors mount, or other location) via one or more types of mounts.

The imaging system 100 includes, according to one implementation, a processing component 105, a memory component 110, an image capture component 115, an image interface 120, a control component 125, a display component 130, a sensing component 135, and/or a network interface 140. The processing component 105, according to various embodiments, includes one or more of a processor, a microprocessor, a central processing unit (CPU), a graphics processing unit (GPU), a single-core processor, a multi-core processor, a microcontroller, a programmable logic device (PLD) (e.g., field programmable gate array (FPGA)), an application specific integrated circuit (ASIC), a digital signal processing (DSP) device, or other logic device that may be configured, by hardwiring, executing software instructions, or a combination of both, to perform various operations discussed herein for embodiments of the disclosure. The processing component 105 may be configured to interface and communicate with the various other components (e.g., 110, 115, 120, 125, 130, 135, 140, etc.) of the imaging system 100 to perform such operations. For example, the processing component 105 may be configured to process captured image data received from the imaging capture component 115, store the image data in the memory component 110, and/or retrieve stored image data from the memory component 110. In one aspect, the processing component 105 may be configured to perform various system control operations (e.g., to control communications and operations of various components of the imaging system 100) and other image processing operations (e.g., data conversion, color correction, video analytics, etc.).

The memory component 110 includes, in one embodiment, one or more memory devices configured to store data and information, including visible-light image data and information. The memory component 110 may include one or more various types of memory devices including volatile and non-volatile memory devices, such as random access memory (RAM), dynamic RAM (DRAM), static RAM (SRAM), non-volatile random-access memory (NVRAM), read-only memory (ROM), programmable read-only memory (PROM), erasable programmable read-only memory (EPROM), electrically-erasable programmable read-only memory (EEPROM), flash memory, hard disk drive, and/or other types of memory. As discussed above, the processing component 105 may be configured to execute software instructions stored in the memory component 110 so as to perform method and process steps and/or operations. In one or more embodiments, such instructions, when executed by the processing component 105, may cause the imaging system 100 to perform operations associated with color correction of images. The processing component 105 and/or the image interface 120 may be configured to store in the memory component 110 images or digital image data captured by the image capture component 115, color correction matrices, and/or other data.

In some embodiments, a separate machine-readable medium 145 (e.g., a memory, such as a hard drive, a compact disk, a digital video disk, or a flash memory) may store the software instructions and/or configuration data which can be executed or accessed by a computer (e.g., a logic device or processor-based system) to perform various methods and operations, such as methods and operations associated with processing image data. In one aspect, the machine-readable medium 145 may be portable and/or located separate from the imaging system 100, with the stored software instructions and/or data provided to the imaging system 100 by coupling the machine-readable medium 145 to the imaging system 100 and/or by the imaging system 100 downloading (e.g., via a wired link and/or a wireless link) from the machine-readable medium 145. It should be appreciated that various modules may be integrated in software and/or hardware as part of the processing component 105, with code (e.g., software or configuration data) for the modules stored, for example, in the memory component 110.

The imaging system 100 may represent an imaging device, such as a video and/or still camera, to capture and process images and/or videos of a scene 160. In this regard, the image capture component 115 of the imaging system 100 may be configured to capture images (e.g., still and/or video images) of the scene 160 in a particular spectrum or modality. The image capture component 115 includes the image detector circuit 165) and the readout circuit 170. For example, the image capture component 115 may include a visible-light imaging sensor. In some cases, alternatively of in addition to capturing radiation from the visible-light spectrum, the image detector circuit 165 may include circuitry to capture radiation from one or more other wavebands of the EM spectrum, such as infrared light, ultraviolet light, and so forth. For example, the image capture component 115 may include an IR imaging sensor (e.g., IR imaging sensor array) configured to detect IR radiation in the near, middle, and/or far IR spectrum and provide IR images (e.g., IR image data or signal) representative of the IR radiation from the scene 160. For example, the image detector circuit 165 may capture (e.g., detect, sense) IR radiation with wavelengths in the range from around 700 nm to around 2 mm, or portion thereof. For example, in some aspects, the image detector circuit 165 may be sensitive to (e.g., better detect) SWIR radiation, mid-wave IR (MWIR) radiation (e.g., EM radiation with wavelength of 2 µm to 5 µm), and/or long-wave IR (LWIR) radiation (e.g., EM radiation with wavelength of 7 µm to 14 µm), or any desired IR wavelengths (e.g., generally in the 0.7 µm to 14 µm range).

The image detector circuit 165 may capture image data (e.g., visible-light image data) associated with the scene 160. To capture a detector output image, the image detector circuit 165 may detect image data of the scene 160 (e.g., in the form of EM radiation) and generate pixel values of the image based on the scene 160. An image may be referred to as a frame or an image frame. In some cases, the image detector circuit 165 may include an array of detectors (e.g., also referred to as an array of pixels) that can detect radiation of a certain waveband, convert the detected radiation into electrical signals (e.g., voltages, currents, etc.), and generate the pixel values based on the electrical signals. Each detector in the array may capture a respective portion of the image data and generate a pixel value based on the respective portion captured by the detector. The pixel value generated by the detector may be referred to as an output of the detector. In one example, each detector may be a photodetector. The array of detectors may be arranged in rows and columns.

The detector output image may be, or may be considered, a data structure that includes pixels and is a representation of the image data associated with the scene 160, with each pixel having a pixel value that represents EM radiation emitted or reflected from a portion of the scene 160 and received by a detector that generates the pixel value. Based on context, a pixel may refer to a detector of the image detector circuit 165 that generates an associated pixel value or a pixel (e.g., pixel location, pixel coordinate) of the detector output image formed from the generated pixel values. In one example, the detector output image may be a visible-light image.

In an aspect, the pixel values generated by the image detector circuit 165 may be represented in terms of digital count values generated based on the electrical signals obtained from converting the detected radiation. For example, in a case that the image detector circuit 165 includes or is otherwise coupled to an analog-to-digital (ADC) circuit, the ADC circuit may generate digital count values (e.g., for each color channel) based on the electrical signals. For an ADC circuit that can represent an electrical signal using 14 bits, the digital count value may range from 0 to 16,383. In such cases, the pixel value of the detector may be the digital count value output from the ADC circuit. In other cases (e.g., in cases without an ADC circuit), the pixel value may be analog in nature with a value that is, or is indicative of, the value of the electrical signal.

The readout circuit 170 may be utilized as an interface between the image detector circuit 165 that detects the image data and the processing component 105 that processes the detected image data as read out by the readout circuit 170, with communication of data from the readout circuit 170 to the processing component 105 facilitated by the image interface 120. An image capturing frame rate may refer to the rate (e.g., detector output images per second) at which images are detected/output in a sequence by the image detector circuit 165 and provided to the processing component 105 by the readout circuit 170. The readout circuit 170 may read out the pixel values generated by the image detector circuit 165 in accordance with an integration time (e.g., also referred to as an integration period).

In some cases, the image capture component 115 may include one or more filters adapted to pass radiation of some wavelengths but substantially block radiation of other wavelengths. For example, the image capture component 115 may be a visible-light imaging device that includes one or more filters adapted to pass visible-light while substantially blocking radiation of other wavelengths. In this example, such filters may be utilized to tailor the image capture component 115 for increased sensitivity to a desired band of visible-light wavelengths.

In some embodiments, the image capture component 115 may include a visible-light sensor device implemented using a complementary metal oxide semiconductor (CMOS) sensor(s) or a charge-coupled device (CCD) sensor(s). In some cases, other imaging sensors may be embodied in the image capture component 115 and operated independently or in conjunction with the visible-light sensor device, and may include a photonic mixer device (PMD) imaging sensor or other time of flight (ToF) imaging sensor, LIDAR imaging device, RADAR imaging device, millimeter imaging device, positron emission tomography (PET) scanner, single photon emission computed tomography (SPECT) scanner, infrared imaging device, ultrasonic imaging device, or other imaging devices operating in particular modalities and/or spectra.

The images, or the digital image data corresponding to the images, provided by the image capture component 115 may be associated with respective image dimensions (also referred to as pixel dimensions). An image dimension, or pixel dimension, generally refers to the number of pixels in an image, which may be expressed, for example, in width multiplied by height for two-dimensional images or otherwise appropriate for relevant dimension or shape of the image. Thus, images having a native resolution may be resized to a smaller size (e.g., having smaller pixel dimensions) in order to, for example, reduce the cost of processing and analyzing the images. Filters (e.g., a non-uniformity estimate) may be generated based on an analysis of the resized images. The filters may then be resized to the native resolution and dimensions of the images, before being applied to the images.

The image interface 120 may include, in some embodiments, appropriate input ports, connectors, switches, and/or circuitry configured to interface with external devices (e.g., a remote device 150 and/or other devices) to receive images (e.g., digital image data) generated by or otherwise stored at the external devices. In an aspect, the image interface 120 may include a serial interface and telemetry line for providing metadata associated with image data. The received images or image data may be provided to the processing component 105. In this regard, the received images or image data may be converted into signals or data suitable for processing by the processing component 105. For example, in one embodiment, the image interface 120 may be configured to receive analog video data and convert it into suitable digital data to be provided to the processing component 105.

The image interface 120 may include various standard video ports, which may be connected to a video player, a video camera, or other devices capable of generating standard video signals, and may convert the received video signals into digital video/image data suitable for processing by the processing component 105. In some embodiments, the image interface 120 may also be configured to interface with and receive images (e.g., image data) from the image capture component 115. In other embodiments, the image capture component 115 may interface directly with the processing component 105.

The control component 125 includes, in one embodiment, a user input and/or an interface device, such as a rotatable knob (e.g., potentiometer), push buttons, slide bar, keyboard, and/or other devices, that is adapted to generate a user input control signal. The processing component 105 may be configured to sense control input signals from a user via the control component 125 and respond to any sensed control input signals received therefrom. The processing component 105 may be configured to interpret such a control input signal as a value, as generally understood by one skilled in the art. In one embodiment, the control component 125 may include a control unit (e.g., a wired or wireless handheld control unit) having push buttons adapted to interface with a user and receive user input control values. In one implementation, the push buttons of the control unit may be used to control various functions of the imaging system 100, such as autofocus, menu enable and selection, field of view, brightness, contrast, noise filtering, image enhancement, and/or various other features of an imaging system or camera.

The display component 130 includes, in one embodiment, an image display device (e.g., a liquid crystal display (LCD)) or various other types of generally known video displays or monitors. The processing component 105 may be configured to display image data and information on the display component 130. The processing component 105 may be configured to retrieve image data and information from the memory component 110 and display any retrieved image data and information on the display component 130. The display component 130 may include display circuitry, which may be utilized by the processing component 105 to display image data and information. The display component 130 may be adapted to receive image data and information directly from the image capture component 115, processing component 105, and/or image interface 120, or the image data and information may be transferred from the memory component 110 via the processing component 105. In some aspects, the control component 125 may be implemented as part of the display component 130. For example, a touchscreen of the imaging system 100 may provide both the control component 125 (e.g., for receiving user input via taps, swipes, and/or other gestures) and the display component 130 of the imaging system 100.

The sensing component 135 includes, in one embodiment, one or more sensors of various types, depending on the application or implementation requirements, as would be understood by one skilled in the art. Sensors of the sensing component 135 provide data and/or information to at least the processing component 105. In one aspect, the processing component 105 may be configured to communicate with the sensing component 135. In various implementations, the sensing component 135 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder or time-of-flight camera), and/or whether a tunnel or other type of enclosure has been entered or exited. The sensing component 135 may represent conventional sensors as generally known by one skilled in the art for monitoring various conditions (e.g., environmental conditions) that may have an effect (e.g., on the image appearance) on the image data provided by the image capture component 115.

In some implementations, the sensing component 135 (e.g., one or more sensors) may include devices that relay information to the processing component 105 via wired and/or wireless communication. For example, the sensing component 135 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques. In some embodiments, the processing component 105 can use the information (e.g., sensing data) retrieved from the sensing component 135 to modify a configuration of the image capture component 115 (e.g., adjusting a light sensitivity level, adjusting a direction or angle of the image capture component 115, adjusting an aperture, etc.).

In some embodiments, various components of the imaging system 100 may be distributed and in communication with one another over a network 155. In this regard, the imaging system 100 may include a network interface 140 configured to facilitate wired and/or wireless communication among various components of the imaging system 100 over the network 155. In such embodiments, components may also be replicated if desired for particular applications of the imaging system 100. That is, components configured for same or similar operations may be distributed over a network. Further, all or part of any one of the various components may be implemented using appropriate components of the remote device 150 (e.g., a conventional digital video recorder (DVR), a computer configured for image processing, and/or other device) in communication with various components of the imaging system 100 via the network interface 140 over the network 155, if desired. Thus, for example, all or part of the processing component 105, all or part of the memory component 110, and/or all of part of the display component 130 may be implemented or replicated at the remote device 150. In some embodiments, the imaging system 100 may not include imaging sensors (e.g., image capture component 115), but instead receive images or image data from imaging sensors located separately and remotely from the processing component 105 and/or other components of the imaging system 100. It will be appreciated that many other combinations of distributed implementations of the imaging system 100 are possible, without departing from the scope and spirit of the disclosure.

Furthermore, in various embodiments, various components of the imaging system 100 may be combined and/or implemented or not, as desired or depending on the application or requirements. In one example, the processing component 105 may be combined with the memory component 110, image capture component 115, image interface 120, display component 130, sensing component 135, and/or network interface 140. In another example, the processing component 105 may be combined with the image capture component 115, such that certain functions of processing component 105 are performed by circuitry (e.g., a processor, a microprocessor, a logic device, a microcontroller, etc.) within the image capture component 115.

In an embodiment, the remote device 150 may be referred to as a host device. The host device may communicate with the portion 175 of the imaging system 100 via the network interface 140 and the network 155. For example, the portion 175 of the imaging system 100 may be a camera that can communicate with the remote device 150. The network interface 140 and the network 155 may collectively provide appropriate interfaces, ports, connectors, switches, antennas, circuitry, and/or generally any other components of the portion 175 of the imaging system 100 and the remote device 150 to facilitate communication between the portion 175 of the imaging system 100 and the remote device. Communication interfaces may include an Ethernet interface (e.g., Ethernet GigE interface, Ethernet GigE Vision interface), a universal serial bus (USB) interface, other wired interface, a cellular interface, a Wi-Fi interface, other wireless interface, or generally any interface to allow communication of data between the portion 175 of the imaging system 100 and the remote device 150.

Figure 2:
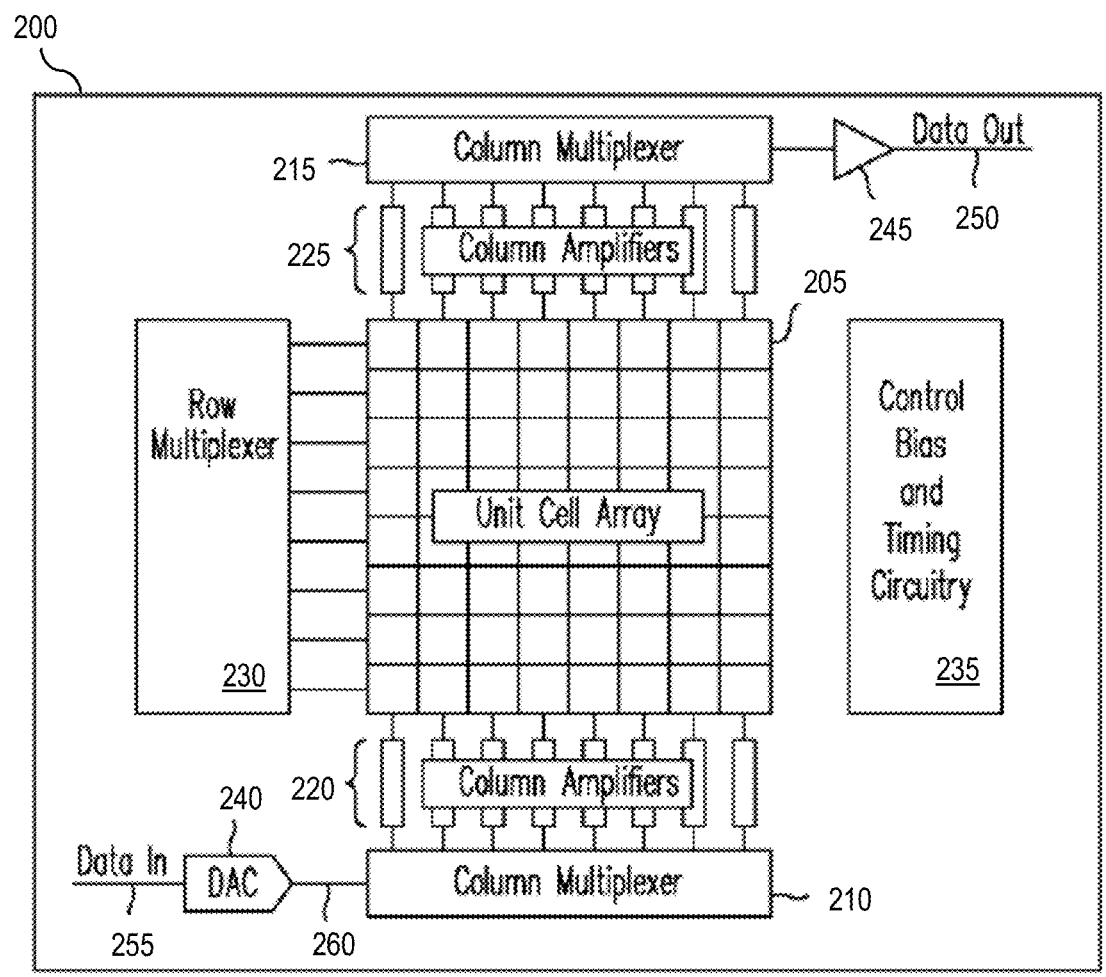
FIG. 2 illustrates a block diagram of an example image sensor assembly in accordance with one or more embodiments of the present disclosure.

FIG. 2 illustrates a block diagram of an example image sensor assembly 200 in accordance with one or more embodiments of the present disclosure. Not all of the depicted components may be required, however, and one or more embodiments may include additional components not shown in the figure. Variations in the arrangement and type of the components may be made without departing from the spirit or scope of the claims as set forth herein. Additional components, different components, and/or fewer components may be provided. In an embodiment, the image capture component 115 of FIG. 1 may be, may include, or may be a part of, the image sensor assembly 200.

The image sensor assembly 200 includes a unit cell array 205, column multiplexers 210 and 215, column amplifiers 220 and 225, a row multiplexer 230, control bias and timing circuitry 235, a digital-to-analog converter (DAC) 240, and a data output buffer 245. In some aspects, operations of and/or pertaining to the unit cell array 205 and other components may be performed according to a system clock and/or synchronization signals (e.g., line synchronization (LSYNC) signals). The unit cell array 205 includes an array of unit cells. In an aspect, each unit cell may include a detector (e.g., a pixel) and interface circuitry. The interface circuitry of each unit cell may provide an output signal, such as an output voltage or an output current, in response to a detection signal (e.g., detection current, detection voltage) provided by the detector of the unit cell. The output signal may be indicative of the magnitude of EM radiation received by the detector and may be referred to as image pixel data or simply image data. The column multiplexer 215, column amplifiers 220, row multiplexer 230, and data output buffer 245 may be used to provide the output signals from the unit cell array 205 as a data output signal on a data output line 250. The output signals on the data output line 250 may be provided to components downstream of the image sensor assembly 200, such as processing circuitry (e.g., the processing component 105 of FIG. 1), memory (e.g., the memory component 110 of FIG. 1), display device (e.g., the display component 130 of FIG. 1), and/or other component to facilitate processing, storage, and/or display of the output signals. The data output signal may be an image formed of the pixel values for the image sensor assembly 200. In this regard, the column multiplexer 215, the column amplifiers 220, the row multiplexer 230, and the data output buffer 245 may collectively provide a readout circuit (or portion thereof) of the image sensor assembly 200. In an aspect, the interface circuitry may be considered part of the readout circuit, or may be considered an interface between the detectors and the readout circuit. In some embodiments, components of the image sensor assembly 200 may be implemented such that the unit cell array 205 and the readout circuit may be part of a single die.

The column amplifiers 225 may generally represent any column processing circuitry as appropriate for a given application (analog and/or digital), and is not limited to amplifier circuitry for analog signals. In this regard, the column amplifiers 225 may more generally be referred to as column processors in such an aspect. Signals received by the column amplifiers 225, such as analog signals on an analog bus and/or digital signals on a digital bus, may be processed according to the analog or digital nature of the signal. As an example, the column amplifiers 225 may include circuitry for processing digital signals. As another example, the column amplifiers 225 may be a path (e.g., no processing) through which digital signals from the unit cell array 205 traverses to get to the column multiplexer 215. As another example, the column amplifiers 225 may include an ADC for converting analog signals to digital signals (e.g., to obtain digital count values). These digital signals may be provided to the column multiplexer 215.

Each unit cell may receive a bias signal (e.g., bias voltage, bias current) to bias the detector of the unit cell to compensate for different response characteristics of the unit cell attributable to, for example, variations in temperature, manufacturing variances, and/or other factors. For example, the control bias and timing circuitry 235 may generate the bias signals and provide them to the unit cells. By providing appropriate bias signals to each unit cell, the unit cell array 205 may be effectively calibrated to provide accurate image data in response to light (e.g., visible-light) incident on the detectors of the unit cells. In an aspect, the control bias and timing circuitry 235 may be, may include, or may be a part of, a logic circuit.

The control bias and timing circuitry 235 may generate control signals for addressing the unit cell array 205 to allow access to and readout of image data from an addressed portion of the unit cell array 205. The unit cell array 205 may be addressed to access and readout image data from the unit cell array 205 row by row, although in other implementations the unit cell array 205 may be addressed column by column or via other manners.

The control bias and timing circuitry 235 may generate bias values and timing control voltages. In some cases, the DAC 240 may convert the bias values received as, or as part of, data input signal on a data input signal line 255 into bias signals (e.g., analog signals on analog signal line(s) 260) that may be provided to individual unit cells through the operation of the column multiplexer 210, column amplifiers 220, and row multiplexer 230. For example, the DAC 240 may drive digital control signals (e.g., provided as bits) to appropriate analog signal levels for the unit cells. In some technologies, a digital control signal of 0 or 1 may be driven to an appropriate logic low voltage level or an appropriate logic high voltage level, respectively. In another aspect, the control bias and timing circuitry 235 may generate the bias signals (e.g., analog signals) and provide the bias signals to the unit cells without utilizing the DAC 240. In this regard, some implementations do not include the DAC 240, data input signal line 255, and/or analog signal line(s) 260. In an embodiment, the control bias and timing circuitry 235 may be, may include, may be a part of, or may otherwise be coupled to the processing component 105 and/or image capture component 115 of FIG. 1.

In an embodiment, the image sensor assembly 200 may be implemented as part of an imaging system (e.g., 100). In addition to the various components of the image sensor assembly 200, the imaging system may also include one or more processors, memories, logic, displays, interfaces, optics (e.g., lenses, mirrors, beamsplitters), and/or other components as may be appropriate in various implementations. In an aspect, the data output signal on the data output line 250 may be provided to the processors (not shown) for further processing. For example, the data output signal may be an image formed of the pixel values from the unit cells of the image sensor assembly 200. The processors may perform operations such as non-uniformity correction (e.g., FFC or other calibration technique), spatial and/or temporal filtering, and/or other operations. The images (e.g., processed images) may be stored in memory (e.g., external to or local to the imaging system) and/or displayed on a display device (e.g., external to and/or integrated with the imaging system). The various components of FIG. 2 may be implemented on a single chip or multiple chips. Furthermore, while the various components are illustrated as a set of individual blocks, various of the blocks may be merged together or various blocks shown in FIG. 2 may be separated into separate blocks.

It is noted that in FIG. 2 the unit cell array 205 is depicted as an 8×8 (e.g., 8 rows and 8 columns of unit cells. However, the unit cell array 205 may be of other array sizes. By way of non-limiting examples, the unit cell array 205 may include 512×512 (e.g., 512 rows and 512 columns of unit cells), 1024×1024, 2048×2048, 4096×4096, 8192×8192, and/or other array sizes. In some cases, the array size may have a row size (e.g., number of detectors in a row) different from a column size (e.g., number of detectors in a column). Examples of image capturing frame rates and/or frame transmission rates may include 30 Hz, 60 Hz, and 120 Hz, although in various embodiments such frame rates may be changed. In an aspect, each unit cell of the unit cell array 205 may represent a pixel.

FIGS. 3 through 6 illustrate flow diagrams of examples processes for facilitating color correction in accordance with one or more embodiments of the present disclosure. Although the processes in these figures are primarily described herein with reference to the imaging system 100 of FIG. 1 for explanatory purposes, the processes can be performed alternatively or in addition (e.g., processing distributed across a camera and a host device) at other imaging systems in which color correction is implemented. Note that one or more operations in these figures may be combined, omitted, and/or performed in a different order as desired.

Figure 3:
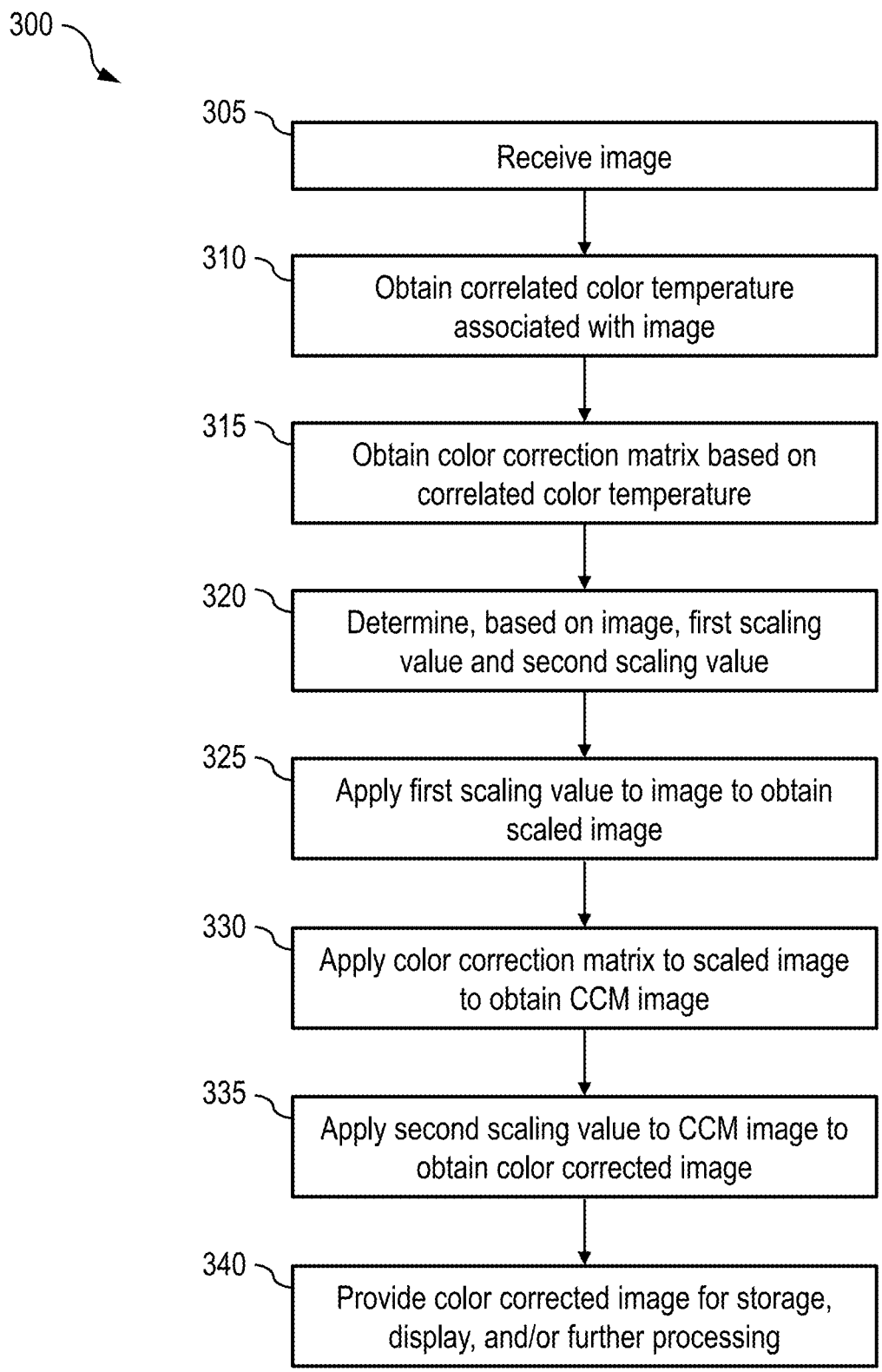
FIG. 3 illustrates a flow diagram of an example process for facilitating color correction in accordance with one or more embodiments of the present disclosure.

FIG. 3 illustrates a flow diagram of an example process 300 for facilitating color correction in accordance with one or more embodiments of the present disclosure. At block 305, a processing circuit (e.g., the processing component 105) of an imaging system (e.g., the imaging system 100) receives an image (e.g., visible-light image). The processing circuit may be implemented in an imaging system (e.g., the imaging system 100) that captures the image, one or more devices remote from the imaging system (e.g., the remote device 150), or the imaging system and the remote device(s) (e.g., processing distributed across the imaging system and the remote device(s)).

The image may be represented in an imager color space (e.g., the imager's RGB color space) associated with the imager used to capture the image. As one example, the image may be received from an image sensor device (e.g., the image capture component 115) of the imaging system. The image sensor device may capture the image in response to radiation (e.g., visible-light radiation) of a scene (e.g., the scene 160) received by the image sensor device. In some cases, the image sensor device and/or circuitry coupled to the image sensor device may convert the radiation into electrical signals (e.g., voltages, currents, etc.) and generate pixel values based on the electrical signals. In an aspect, the pixel values generated by the image sensor device and/or associated circuitry may be represented in terms of digital count values generated based on the electrical signals obtained from converting the detected visible-light radiation. For example, in a case that the image sensor device includes or is otherwise coupled to an ADC circuit, the ADC circuit may generate digital count values based on the electrical signals for each color channel. As another example, the processing circuit may receive or retrieve the image from an image sensor device external to the imaging system and/or a memory (e.g., the memory component 110) of the imaging system or other system that stores captured images.

At block 310, the processing circuit obtains a correlated color temperature associated with the image. In one aspect, the processing circuit may obtain the correlated color temperature by receiving user input (e.g., input manually provided by the user of the imaging system) indicative of the correlated color temperature to be associated with the image. As an example, the user may select from a predetermined set of correlated color temperature options and/or a predetermined set of illuminant spectral power distribution options (e.g., which in turn can be associated with correlated color temperatures). The predetermined set of correlated color temperatures and/or the predetermined set of illuminant spectral power distributions may be presented on a user interface (e.g., on the display component 130) to the user for selection by the user. By way of non-limiting examples, the user may be provided with a list of correlated color temperatures including 2,700 K, 3,000 K, 4,000 K, 5,500 K, and/or 7,000 K. The various correlated color temperatures may be identified numerically by their temperature values and/or by names/identifiers such as tungsten light (e.g., 2,700 K), warm fluorescent (e.g., 3,000 K), cold fluorescent (e.g., 4,000 K), average sunlight (e.g., 5,500 K), and/or cloudy (e.g., 7,000 K).

In another aspect, the processing circuit may determine the correlated color temperature associated with the image. In some cases, based on an analysis of the image, the processing circuit may determine the correlated color temperature based on chromaticity coordinates (e.g., xy chromaticity coordinates) that characterize the scene captured by the image. The chromaticity coordinates may be determined based on histogram data of the image. In one case, the chromaticity coordinates may be based on a statistic of the histogram data, such as a histogram average. The histogram data may be collected before channel digital gains or other processing is applied. The histogram data may be based on a single histogram that characterizes the image or a set of histograms accumulated over parts of the image. In some cases, the histogram data may be based on a portion of the image. For example, outliers (e.g., pixels falling in bins associated with oversaturation values) in each color channel may be discarded from the histogram and the average determined from the histogram with the outliers removed.

In one non-limiting approach, the processing circuit may white balance the histogram statistic, convert from the imager color space to a standard color space (e.g., standard RGB color space), normalize to values between 0 and 1, convert to CIE XYZ tristimulus values (e.g., using D50 as a reference illuminant), and convert these XYZ values to obtain the chromaticity coordinates. A mapping (e.g., McCamy relationship) may be used to map the chromaticity coordinates to the correlated color temperature. Although the foregoing provides one example approach and example mapping to determining chromaticity coordinates, other mappings, other illuminants, other histogram statistics, and/or other characteristics associated with the image may be used to determine the chromaticity coordinates and/or the correlated color temperature.

At block 315, the processing circuit obtains a CCM based on the correlated color temperature associated with the image. In one aspect, the processing circuit may select the CCM from among a predetermined set of CCMs based on the correlated color temperature. The predetermined CCMs may be referred to as pre-trained CCMs. The predetermined set of CCMs may be stored in a memory (e.g., the memory component 110) of the imaging system or other system. For example, each of the stored CCMs is associated with a correlated color temperature, and the processing circuit may select the CCM that is associated with a correlated color temperature that is closest to the correlated color temperature obtained by the processing circuit at block 310. In some cases, the CCM obtained by the processing circuit at block 310 may be a polynomial CCM. As one example, the polynomial CCM may be a 3×9 matrix associated with a vector $(R, G, B, R^2, G^2, B^2, RG, GB, RB)^T$ expanded from an $(R, G, B)^T$ vector using a polynomial regression.

For a given correlated color temperature, a CCM may be trained based on a known spectral response of the imager used to capture the image and spectral power distribution (SPD) and/or empirically using a color chart. As a non-limiting example, the empirical approach may involve using a set of patches having a known color (e.g., color checker such as the Macbeth color checker). In this regard, these patches have ground truth values (e.g., ground truth RGB values). The empirical approach may include capturing an image of the color checker under a known illumination (e.g., known uniform illumination), determining color values (e.g., RGB values) in the imager's color space for each of the color patches, and determining a CCM that appropriately (e.g., optimally) maps the color values in the imager's color space to the ground truth color values. The determined CCM may be stored (e.g., as part of the predetermined set of CCMs). In some cases, CCMs may be pre-trained and stored for subsequent application on images associated with appropriate correlated color temperatures. In other cases, alternatively or in addition, a CCM may be trained on the fly for use with the image.

At block 320, the processing circuit determines, based on the image, a scaling value $scale_1$ and a scaling value $scale_2$. In an aspect, the scaling values $scale_1$ and $scale_2$ may be determined based on a relative luminance of the image. In some cases, the scaling values $scale_1$ and $scale_2$ may be based further on a relative luminance of a calibration image associated with the CCM obtained at block 315. In one example, the scaling value $scale_1$ may be provided by $scale_1 = I_{calib}/I_{im}$, where $I_{calib}$ and $I_{im}$ is a relative luminance of the calibration image and the image received at block 305, respectively. In an aspect, the scaling value $scale_2$ may be an inverse of the scaling value $scale_1$.

At block 325, the processing circuit applies the scaling value $scale_1$ to the image to obtain a scaled image. At block 330, the processing circuit applies the CCM obtained at block 315 to the scaled image to obtain a CCM image. At block 335, the processing circuit applies the scaling value $scale_2$ to the CCM image to obtain a color corrected image. In this regard, the processing circuit generates the color corrected image based on the scaling value $scale_1$, the scaling value $scale_2$, and the CCM. In an embodiment, scaling an overall brightness of the image received at block 305 both before and after applying the CCM (e.g., polynomial CCM) may reduce exposure-dependency and improve color quality. At block 340, the processing circuit provides the color corrected image for storage, display, and/or further processing. As one example, an sRGB gamma may be applied to the color corrected image and this gamma-applied image displayed on a display device (e.g., a monitor calibrated for displaying in a standard color space, such as an sRGB monitor) for human viewing. As another example, the image obtained at block 305 may be a visible-light image that may then be combined/fused (e.g., by the processing circuit and/or other processor) with an image associated with another waveband, such as an infrared image (e.g., a thermal infrared image).

Figure 4:
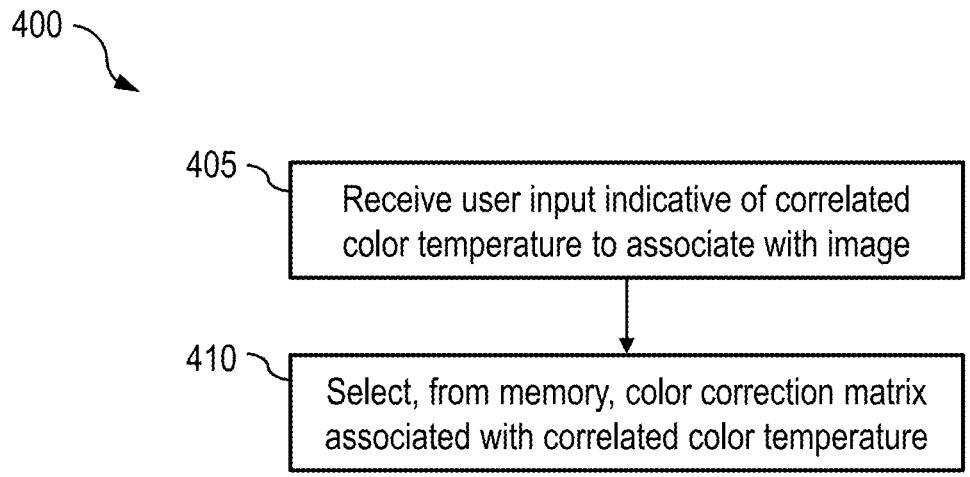
FIG. 4 illustrates a flow diagram of an example process for obtaining a color correction matrix for an image via user input in accordance with one or more embodiments of the present disclosure.

FIG. 4 illustrates a flow diagram of an example process 400 for obtaining a CCM for an image via user input in accordance with one or more embodiments of the present disclosure. At block 405, a processing circuit (e.g., the processing component 105) of an imaging system (e.g., the imaging system 100) receives user input indicative of a correlated color temperature to associate with an image (e.g., received from an image sensor device or from a memory that stores previously captured images). At block 410, the processing circuit selects/retrieves, from a memory (e.g., the memory component 110), a CCM (e.g., from among a predetermined set of CCMs stored in the memory) associated with the correlated color temperature indicated by the received user input. For example, the user may select a correlated color temperature from among a set of correlated color temperatures displayed to the user via a user interface, where each of these correlated color temperatures may be associated with a pre-trained CCM. In some cases, the CCM selected at block 410 may be used in the process 300 (e.g., at block 330 of FIG. 3) for color correction of the image. In other cases, the CCM selected at block 410 may be used in other processes relating to color correction of the image, such as color correction in which the CCM is applied to the image (e.g., without a scaling value applied prior to applying the CCM and/or a scaling value applied after applying the CCM). In an embodiment, block 405 may implement block 310 of FIG. 3 and/or block 410 may implement block 315 of FIG. 3.

Figure 5:
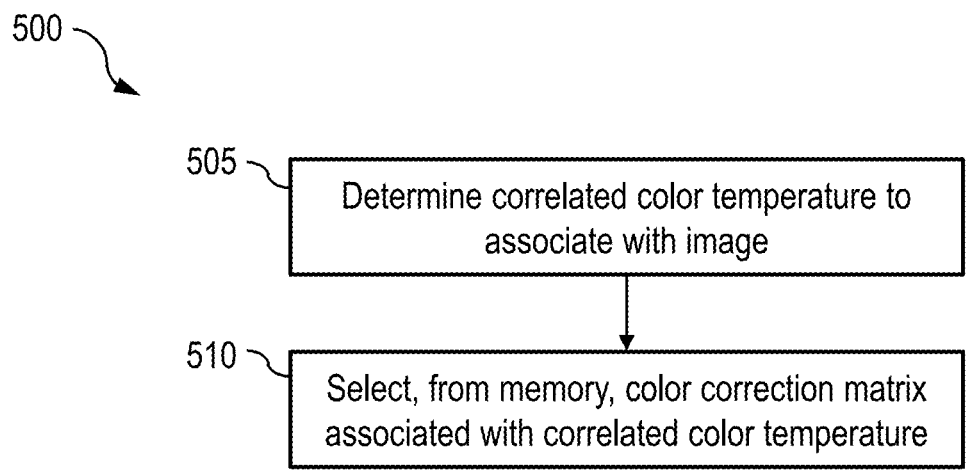
FIGS. 5 and 6 each illustrate a flow diagram of an example process for obtaining a color correction matrix for an image according to a computed correlated color temperature of the image in accordance with one or more embodiments of the present disclosure.

FIG. 5 illustrates a flow diagram of an example process 500 for obtaining a CCM for an image according to a computed (e.g., estimated) correlated color temperature of an image in accordance with one or more embodiments of the present disclosure. At block 505, a processing circuit (e.g., the processing component 105) of an imaging system (e.g., the imaging system 100) determines (e.g., estimates) a correlated color temperature to associate with an image (e.g., received from an image sensor device or from a memory that stores previously captured images). In one example, the processing circuit may determine histogram data based on the image, determine chromaticity coordinates based on the histogram data, and determine the correlated color temperature based on the chromaticity coordinates. At block 510, the processing circuit selects/retrieves, from a memory (e.g., the memory component 110), a CCM (e.g., from among a predetermined set of CCMs stored in the memory) associated with the correlated color temperature determined at block 505. For example, the processing circuit may select the CCM associated with a correlated color temperature closest to the correlated color temperature determined at block 505. In some cases, the CCM selected at block 510 may be used in the process 300 (e.g., at block 330 of FIG. 3) for color correction of the image. In other cases, the CCM selected at block 510 may be used in other processes relating to color correction of the image, such as color correction in which the CCM is applied to the image (e.g., without a scaling value applied prior to applying the CCM and/or a scaling value applied after applying the CCM). In an embodiment, block 505 may implement block 310 of FIG. 3 and/or block 510 may implement block 315 of FIG. 3.

Figure 6:
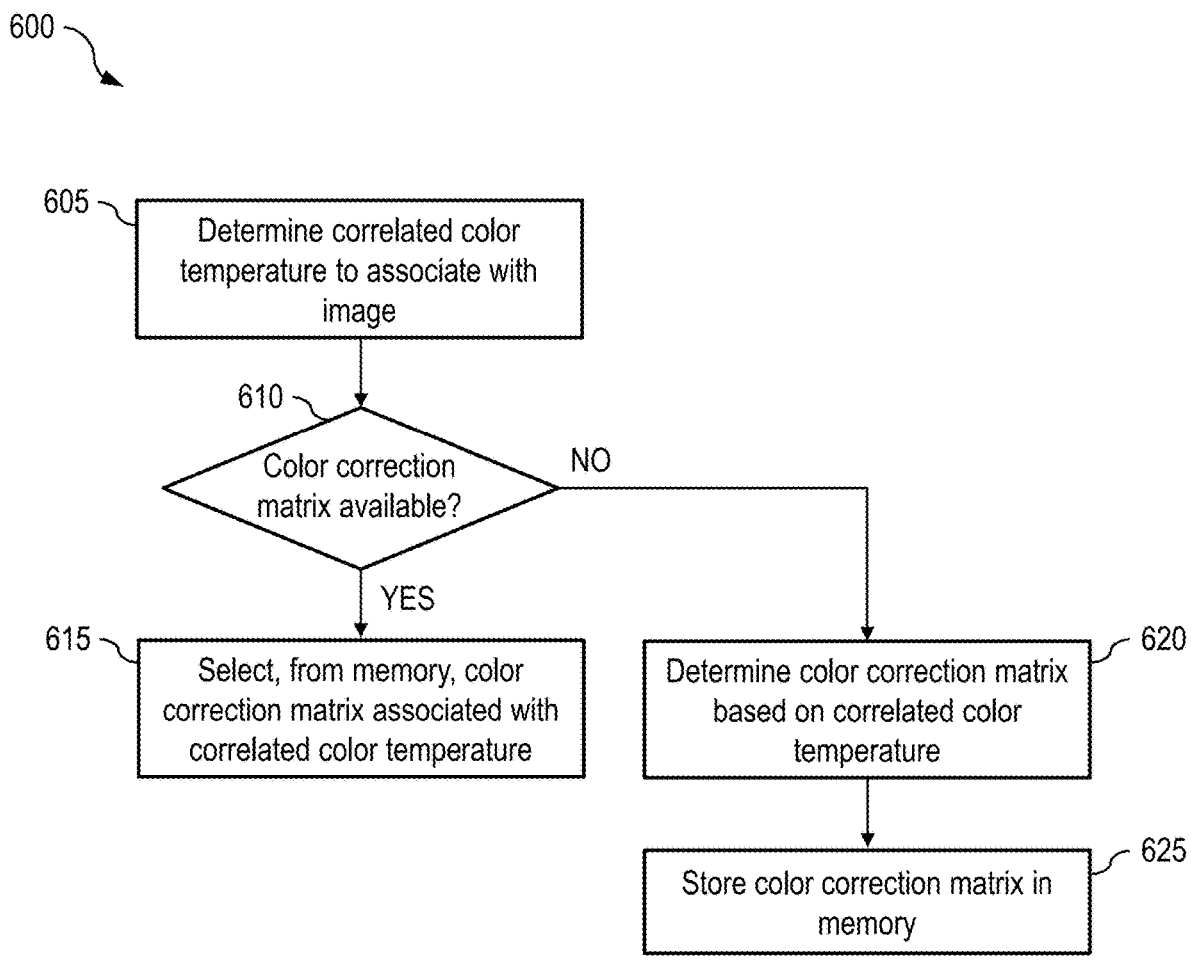

FIG. 6 illustrates a flow diagram of an example process 600 for obtaining a CCM for an image in accordance with one or more embodiments of the present disclosure. At block 605, a processing circuit (e.g., the processing component 105) of an imaging system (e.g., the imaging system 100) determines (e.g., estimates) a correlated color temperature to associated with an image (e.g., received from an image sensor device or from a memory that stores previously captured images).

At block 610, the processing circuit determines whether a CCM associated with the correlated color temperature determined at block 605 is available for retrieval. A CCM associated with the correlated color temperature may be available for retrieval if the CCM was pre-trained, such as by a manufacturer of the imaging system (e.g., built into the imaging system and/or as an update to the imaging system after shipment to the user), by a user of the imaging system, by users of other imaging systems (e.g., and the pre-trained CCM provided by such users for use by other users), and/or by others.

In one aspect, for a given correlated color temperature determined at block 605, a CCM may be considered to be available for the correlated color temperature if the correlated color temperature is within a certain threshold range/percentage around the correlated color temperature of the CCM. For example, for a CCM (e.g., stored in a memory) associated with a correlated color temperature of 3,000 K, the processing circuit may determine this CCM as being available for the correlated color temperature determined at block 605 if the correlated color temperature determined at block 605 is between 3,000 K±300 K (e.g., or equivalently 3,000 K±10%). In some cases, different CCMs may be associated with different threshold ranges/percentages around a nominal correlated color temperature. In some cases, the threshold range(s)/percentage(s) may be set by a user, a manufacturer (e.g., as default threshold range(s)/percentage(s)), and/or others associated with using and/or configuring the imaging system 100. As one example, the threshold range/percentage may be set to 0 K or 0% (e.g., the correlated color temperature associated with the CCM has to match the correlated color temperature determined at block 605 to be considered a CCM available for the correlated color temperature determined at block 605.)

If the processing circuit determines at block 610 that the CCM is available for the correlated color temperature determined at block 605, the process 600 proceeds to block 615. At block 615, the processing circuit selects/retrieves, from a memory (e.g., the memory component 110), a CCM associated with the correlated color temperature determined at block 605. The CCM selected at block 615 may be used (e.g., at block 330 of FIG. 3) for color correction of the image.

If the processing circuit determines at block 610 that no CCM is available for the correlated color temperature determined at block 605, the process 600 proceeds to block 620. At block 620, the processing circuit determines a CCM based on the correlated color temperature determined at block 605. CCM entries/elements may be determined/trained (e.g., on the fly). In an aspect, for a given set of illuminants (e.g., daylight illuminates), spectral power distributions may be determined for different color correlated temperatures (e.g., color correlated temperatures falling within a range from around 2,500 K to around 30,000 K). As such, based on the color correlated temperature determined at block 605, an associated spectral power distribution may be determined on the fly. Entries/elements of a CCM may be determined/trained on the fly based on the spectral power distribution and the known spectral response of the imager used to capture the image to which the CCM is to be applied.

As an example, the spectral power distribution and the known spectral response of the imager may allow RGB values to be simulated, and these simulated RGB values may be compared with ground truth RGB values. In an aspect, the ground truth RGB values may provide/define the calibration image and an average relative luminance of the ground truth RGB values may provide the $I_{calib}$ used in determining the scaling values (e.g., at block 320 of FIG. 3). Such comparisons between the simulated values and ground truth values may be used to determine the entries/elements of the CCM. In one example, during a CCM calibration step both the ground truth RGB and camera space RGB may be simulated according to RGB'=response'[illuminant SPD ⊙ standardized reflectance], where RGB provides the RGB values, response is a camera spectral response when camera RGB is simulated or a CIE standard observer (also known as a color matching function) when ground truth RGB is simulated, standardized reflectance is a set of reflectance values at certain wavelengths, and ⊙ denotes an element-wise multiplication operator. While $I_{calib}$ is not used in the calibration process, $I_{calib}$ may be stored as a parameter together with its associated CCM.

At block 625, the processing circuit caches/stores the CCM determined at block 620 in a memory (e.g., the memory component 110). The CCM determined at block 620 may be used (e.g., at block 330 of FIG. 3) for color correction of the image and may be selectable/retrievable by the processing circuit at block 615 for subsequent images (e.g., to avoid repeated computations) having a correlated color temperature associated with the CCM determined at block 620. In some cases, the CCM determined at block 620 may be used in other processes relating to color correction of the image, such as color correction in which the CCM is applied to the image (e.g., without a scaling value applied prior to applying the CCM and/or a scaling value applied after applying the CCM). In some aspects, determining CCMs on the fly and storing them as they are determined rather than pre-training and storing a large number of CCMs (e.g., intended to accommodate a wide range of possible outdoor light) may conserve memory/storage resources but utilize more computational resources. In an embodiment, block 605 may implement block 310 of FIG. 3 and/or blocks 615 and/or 620 may implement block 315 of FIG. 3.

Figure 7A:
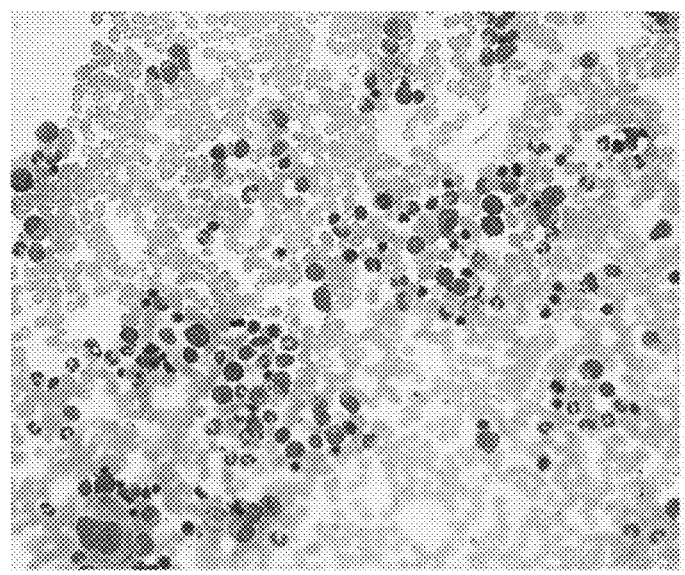
FIG. 7A illustrates an example image without color correction applied.
Figure 7B:
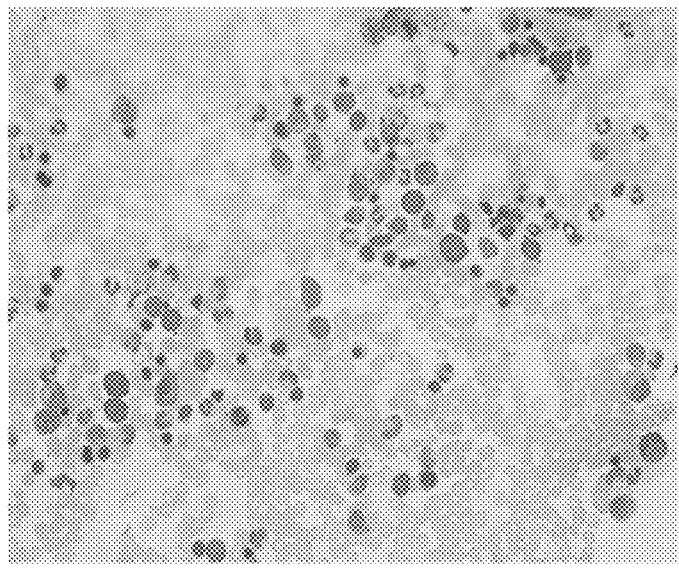
FIG. 7B illustrates an image at a target quality.
Figure 7C:
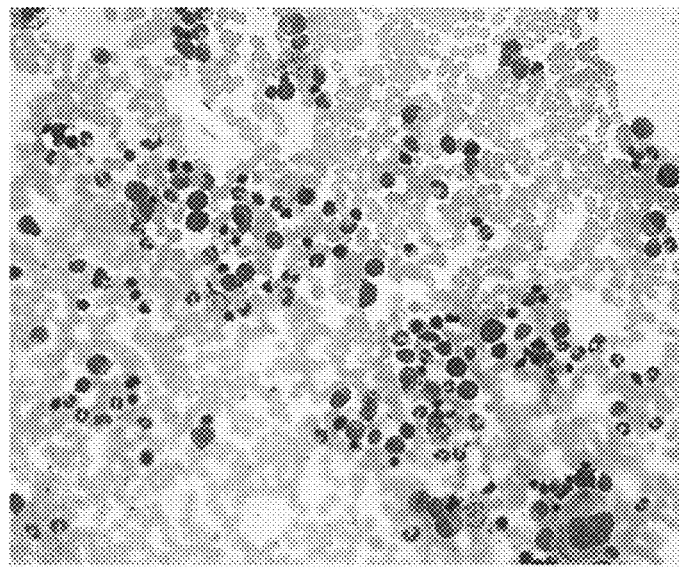
FIG. 7C illustrates the image of FIG. 7A with a linear color correction matrix applied.
Figure 7D:
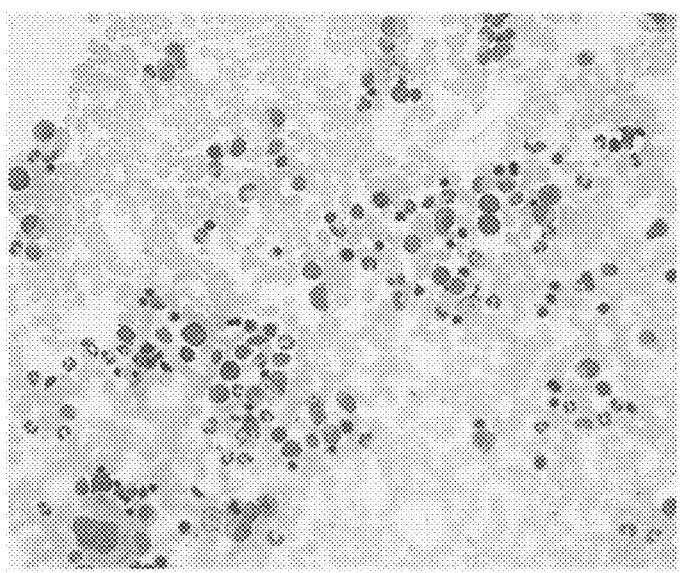
FIG. 7D illustrates the image of FIG. 7A with a polynomial color correction matrix and sRGB gamma applied.

As one example, color correction may be utilized in the life sciences. FIG. 7A illustrates an example image of blood cells without color correction applied. FIG. 7B illustrates an image at a target quality. FIG. 7C illustrates the image of FIG. 7A with a linear CCM applied. FIG. 7D illustrates the image of FIG. 7A with a polynomial CCM and sRGB gamma applied. As shown by comparing the image of FIG. 7D to the images shown in FIGS. 7A-7C, the image of FIG. 7D is closer than the images of FIGS. 7A and 7C to the desired image shown in FIG. 7B.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A method comprising:
receiving an image;
determining, based at least on the image, a first scaling value and a second scaling value;
applying the first scaling value to the image to obtain a scaled image;
applying a color correction matrix (CCM) to the scaled image to obtain a CCM image; and
applying the second scaling value to the CCM image to obtain a color corrected image.

2. The method of claim 1, wherein the CCM comprises a polynomial CCM.

3. The method of claim 1, wherein the second scaling value is an inverse of the first scaling value.

4. The method of claim 1, further comprising:
obtaining a correlated color temperature associated with the image; and
obtaining the CCM based on the correlated color temperature.

5. The method of claim 1, wherein the first scaling value is based on a relative luminance associated with the image and a relative luminance associated with a calibration image.

6. The method of claim 1, further comprising capturing, by an image sensor device, the image, wherein the image comprises a visible-light image, and providing the color corrected image for display and/or storage.

7. A method comprising:
receiving an image;
obtaining a correlated color temperature associated with the image, wherein the obtaining the correlated color temperature comprises:
determining histogram data based on the image;
determining chromaticity coordinates associated with the image based on the histogram data; and
determining the correlated color temperature based at least on the chromaticity coordinates;
obtaining a color correction matrix (CCM) based on the correlated color temperature; and
generating a color corrected image based on the CCM.

8. The method of claim 7, further comprising determining, based at least on the image, a first scaling value and a second scaling value, wherein the color corrected image is further based on the first scaling value and the second scaling value.

9. The method of claim 7, further comprising:
receiving a second image;
obtaining a second correlated color temperature associated with the second image, wherein the obtaining the second correlated color temperature comprises receiving user input indicative of the second correlated color temperature;
obtaining a second CCM based on the second correlated color temperature; and
generating a second color corrected image based on the second CCM.

10. The method of claim 7, wherein the obtaining the CCM comprises retrieving, from a memory and based on the correlated color temperature, the CCM from among a plurality of predetermined CCMs stored in the memory, and wherein each of the plurality of predetermined CCMs is associated with a respective correlated color temperature.

11. The method of claim 7, further comprising determining a spectral power distribution based at least on the correlated color temperature, wherein the CCM is based on the spectral power distribution.

12. The method of claim 7, further comprising:
determining whether a correction matrix associated with the correlated color temperature is stored in a memory;
when a correction matrix associated with the correlated color temperature is determined to be stored, retrieving, from the memory, the CCM; and
when a correction matrix associated with the correlated color temperature is determined not to be stored:
determining a spectral power distribution based at least on the correlated color temperature, wherein the CCM is determined based on the spectral power distribution; and
storing the CCM in the memory.

13. A system comprising:
a processing circuit configured to:
receive an image;
determine, based at least on the image, a first scaling value and a second scaling value;
apply the first scaling value to the image to obtain a scaled image;
apply a color correction matrix (CCM) to the scaled image to obtain a CCM image; and
apply the second scaling value to the CCM image to obtain a color corrected image.

14. The system of claim 13, wherein the CCM comprises a polynomial CCM, wherein the second scaling value is an inverse of the first scaling value, and wherein the processing circuit is further configured to:
obtain a correlated color temperature associated with the image; and
obtain the CCM based on the correlated color temperature.

15. The system of claim 14, wherein the processing circuit is configured to obtain the correlated color temperature by receiving user input indicative of the correlated color temperature;
and/or wherein the processing circuit is configured to obtain the CCM by retrieving, from a memory and based on the correlated color temperature, the CCM from among a plurality of predetermined CCMs stored in the memory, and wherein each of the plurality of predetermined CCMs is associated with a respective correlated color temperature.

16. The system of claim 14, wherein:
the processing circuit is further configured to determine a spectral power distribution based at least on the correlated color temperature; and
the processing circuit is configured to determine the CCM based on the spectral power distribution.

17. The system of claim 14, wherein:
the processing circuit is further configured to determine whether a correction matrix associated with the correlated color temperature is stored in a memory; and
the processing circuit is configured to:
when a correction matrix associated with the correlated color temperature is determined to be stored, retrieve the CCM from the memory; and when a correction matrix associated with the correlated color temperature is determined not to be stored:
- determine a spectral power distribution based at least on the correlated color temperature;
- determine the CCM based on the spectral power distribution; and
- store the CCM in the memory.

18. The system of claim 13, further comprising an image sensor device configured to store the image, and wherein the first scaling value is based on a relative luminance associated with the image and a relative luminance associated with a calibration image.

19. The system of claim 13, wherein the image comprises a visible-light image, wherein the processing circuit is further configured to provide the color corrected image for display and/or storage.

20. The system of claim 14, wherein the processing circuit is configured to obtain the correlated color temperature by:
- determining chromaticity coordinates associated with the image; and
- determining the correlated color temperature based at least on the chromaticity coordinates.

* * * * *

UNITED STATES PATENT AND TRADEMARK OFFICE
CERTIFICATE OF CORRECTION

| | | |
|---|---|---|
| PATENT NO. | : 11,924,590 B2 | |
| APPLICATION NO. | : 17/701629 | |
| DATED | : March 5, 2024 | |
| INVENTOR(S) | : Darya Ismailova and Shuen Yan Stephen Se | |

It is certified that error appears in the above-identified patent and that said Letters Patent is hereby corrected as shown below:

In the Specification

In the DETAILED DESCRIPTION:

Column 3, Line 67, change "and $L_{im}$ is the" to --and $I_{im}$ is the--.

Signed and Sealed this
Sixteenth Day of April, 2024

Katherine Kelly Vidal
*Director of the United States Patent and Trademark Office*